(12) United States Patent
Reed et al.

(10) Patent No.: US 7,276,006 B2
(45) Date of Patent: Oct. 2, 2007

(54) TRANSMISSION CASE FOR LUBE RETURN AND METHOD

(75) Inventors: William S. Reed, Greenfield, IN (US); Bert D. Love, Brownsburg, IN (US)

(73) Assignee: General Motors Corporation, Detroit, MI (US)

( * ) Notice: Subject to any disclaimer, the term of this patent is extended or adjusted under 35 U.S.C. 154(b) by 289 days.

(21) Appl. No.: 11/060,225

(22) Filed: Feb. 17, 2005

(65) Prior Publication Data

US 2005/0204861 A1    Sep. 22, 2005

Related U.S. Application Data

(60) Provisional application No. 60/555,141, filed on Mar. 22, 2004.

(51) Int. Cl.
*F16H 3/72* (2006.01)
*F16H 57/04* (2006.01)

(52) U.S. Cl. .......................... 475/5; 475/159; 184/6.12

(58) Field of Classification Search .................... 475/5, 475/159; 74/606 R, 467, 468; 123/195 C, 123/196 R; 184/6.12
See application file for complete search history.

(56) References Cited

U.S. PATENT DOCUMENTS

| | | | | | |
|---|---|---|---|---|---|
| 2,984,122 | A | * | 5/1961 | Woolley | .................... 74/606 R |
| 4,329,887 | A | * | 5/1982 | Kawamoto | .................... 74/467 |
| 5,372,213 | A | * | 12/1994 | Hasebe et al. | ............. 180/65.6 |
| 6,227,333 | B1 | * | 5/2001 | Scheib et al. | ............... 184/6.22 |
| 6,497,211 | B2 | | 12/2002 | Nomura et al. | ............. 123/195 |
| 6,644,440 | B2 | * | 11/2003 | Kageyama et al. | ........ 184/11.2 |
| 6,729,206 | B2 | * | 5/2004 | Hayabuchi et al. | ....... 74/606 R |
| 7,002,267 | B2 | * | 2/2006 | Raszkowski et al. | ......... 310/54 |

* cited by examiner

*Primary Examiner*—Roger Pang

(57) ABSTRACT

The invention provides a transmission case that includes a rear housing that partially encloses transmission components about a center axis. The rear housing sealingly connects to a main housing at one end and to a drive unit extension at another end. The rear housing has an axial passage generally parallel to the center axis and a cross passage that is substantially perpendicular to the axial passage. The cross passage is in fluid communication with the axial passage to allow draining of fluid within the drive unit extension to the main housing. A method of returning fluid to a transmission oil sump is also provided.

16 Claims, 4 Drawing Sheets

TRANSMISSION CASE FOR LUBE RETURN AND METHOD

CROSS REFERENCE TO RELATED APPLICATIONS

This application claims the benefit of U.S. Provisional Application 60/555,141, filed Mar. 22, 2004, which is hereby incorporated by reference in its entirety.

TECHNICAL FIELD

This invention relates to a transmission housing and lubrication flow therethrough.

BACKGROUND OF THE INVENTION

Current transmissions require either a long, compound angle drilled oil hole, or a cored cast oil hole to return oil (i.e., lubricating and cooling fluid) from the rear end bearing, bushing and output seal lube to the sump. This is necessary in order to route the oil return around rearward-located clutches and to prevent oil from pooling at the output seal.

SUMMARY OF THE INVENTION

A novel transmission case and method to allow draining of oil (i.e., cooling and lubricating fluid) from a rear portion of the transmission is provided. Within the scope of the invention, a transmission case includes a rear housing that partially encloses transmission components about a center axis. The rear housing sealingly connects to a main housing at one end and to a drive unit extension at another end. The rear housing has an axial passage generally parallel to the center axis and a cross passage that is substantially perpendicular to the axial passage. The cross passage is in fluid communication with the axial passage to allow draining of fluid from the drive unit extension to the main housing.

In one aspect of the invention, a well is formed between the rear housing and the drive unit extension when they are connected to one another. The well is in fluid communication with the axial passage so that fluid drains from the well through the axial passage. The axial passage may be positioned on the rear housing so that a predetermined level of fluid is maintained in the well for lubricating an output seal on the drive unit extension. The fluid may also lubricate a bearing within the drive unit extension.

In another aspect of the invention, the rear housing at least partially forms a first and a second internal well that are fluidly connected via the cross passage. Fluid drained to the main housing through the axial passage passes through the first and second internal wells. Preferably, the transmission components include a park engagement gear housed in the first internal well. Preferably, the rear housing also has a second axial passage in fluid communication between the cross passage and the main housing for draining fluid to the main housing (e.g., from the second well). The second axial passage may be cast in the rear housing.

Because the rear housing utilizes an axial passage and a perpendicular cross passage in combination with internal wells formed in the rear housing, leak problems associated with angle drilling and the expense associated with sand casting drain passages are avoided. Accordingly, preferably the rear housing is formed by die casting. The axial passage and the cross passage may be drilled after the casting process or, depending on their size and location, formed during the die casting.

Accordingly, the invention also provides a method of returning fluid in a transmission to a transmission oil sump. The method includes casting a rear housing, which may have a generally frustoconical shape (i.e., the shape created by slicing the top off of a cone, with the cut made parallel to the base of the cone). The method further includes drilling a generally axial passage (i.e., a passage generally parallel to a center axis of the transmission) in the rear housing and drilling another passage generally perpendicular to the axial passage in the rear housing. The method includes connecting the rear housing to a main housing so that transmission components are contained within the rear housing. The method also includes connecting a drive unit extension to the rear housing to form a well therebetween. Finally, the method includes lubricating an output seal connected to the drive unit extension and draining fluid in the well used to lubricate the output seal to an oil sump through the axial passage and the cross passage. The casting step may include forming first and second internal wells in the rear housing so that the cross passage fluidly connects the wells. Additionally, the casting step may include forming another axial passage in the rear housing adjacent the second internal well for emptying the fluid from the rear housing to the main housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
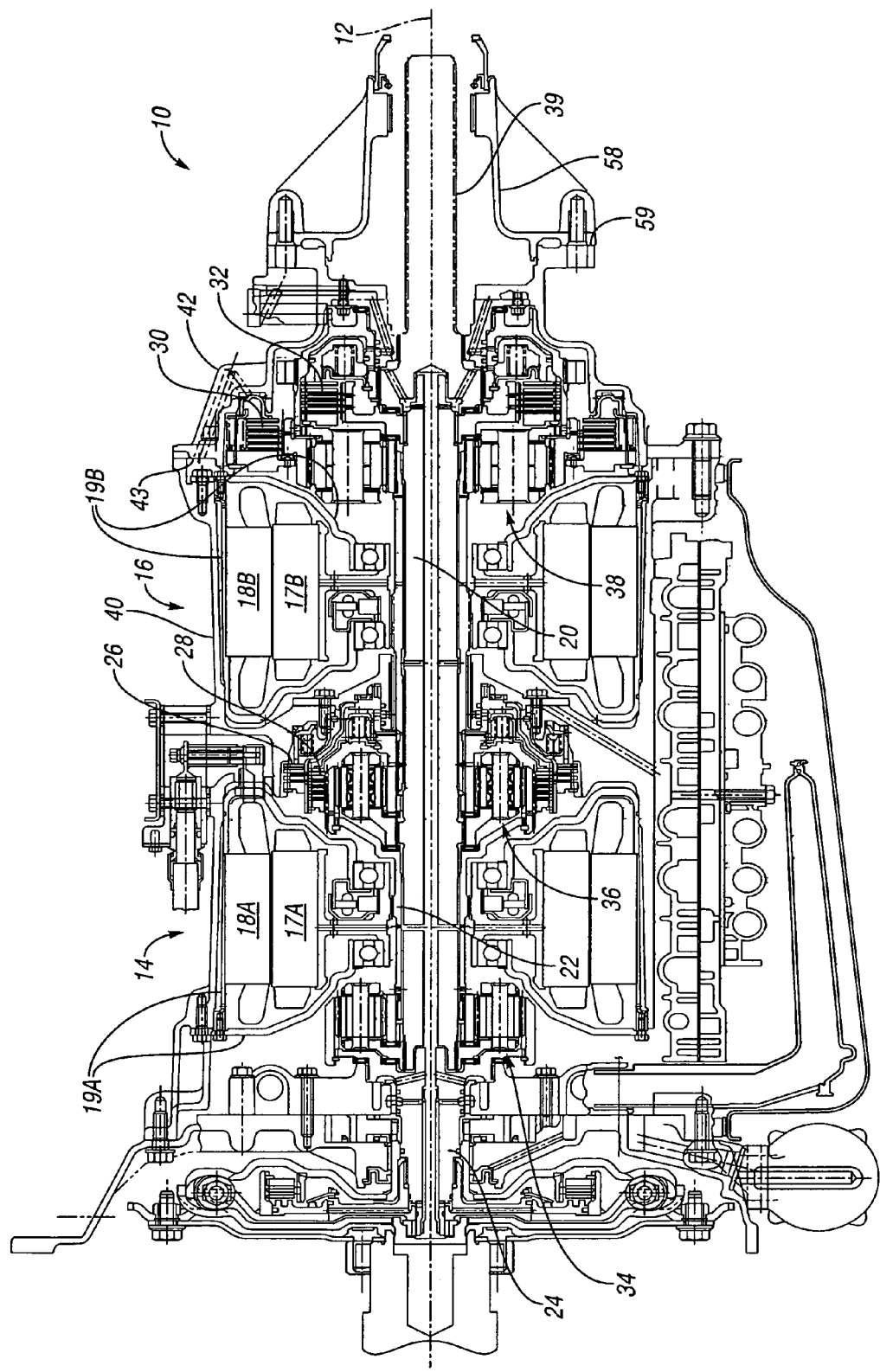
FIG. 1 is a schematic cross-sectional view of an electromechanical transmission including a main housing and a rear housing.

Referring to the drawings, wherein like reference numbers refer to like components, FIG. 1 shows a hybrid electromechanical transmission 10 with a center axis 12. First and second electric motor/generators modules 14, 16, respectively, are disposed about the center axis 12 within the transmission 10. Each of the motor/generator modules 14, 16 includes a respective rotor 17A, 17B, a respective stator 18A, 18B, and a motor housing 19A, 19B (each rotor and stator pair is an electric motor/generator). The electric motor/generator modules 14, 16 (labeled A and B) can be combined in various modes to accelerate and move a vehicle, to start an engine connected to the transmission, to brake the vehicle, and to charge batteries connected to the modules 14, 16.

A main shaft 20 is longitudinally disposed, rotatable about the center axis 12. Several inner shafts, such as inner shaft 22, are concentrically disposed about the main shaft 20, and are likewise rotatable about the center axis 12. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member 39.

Figure 2:
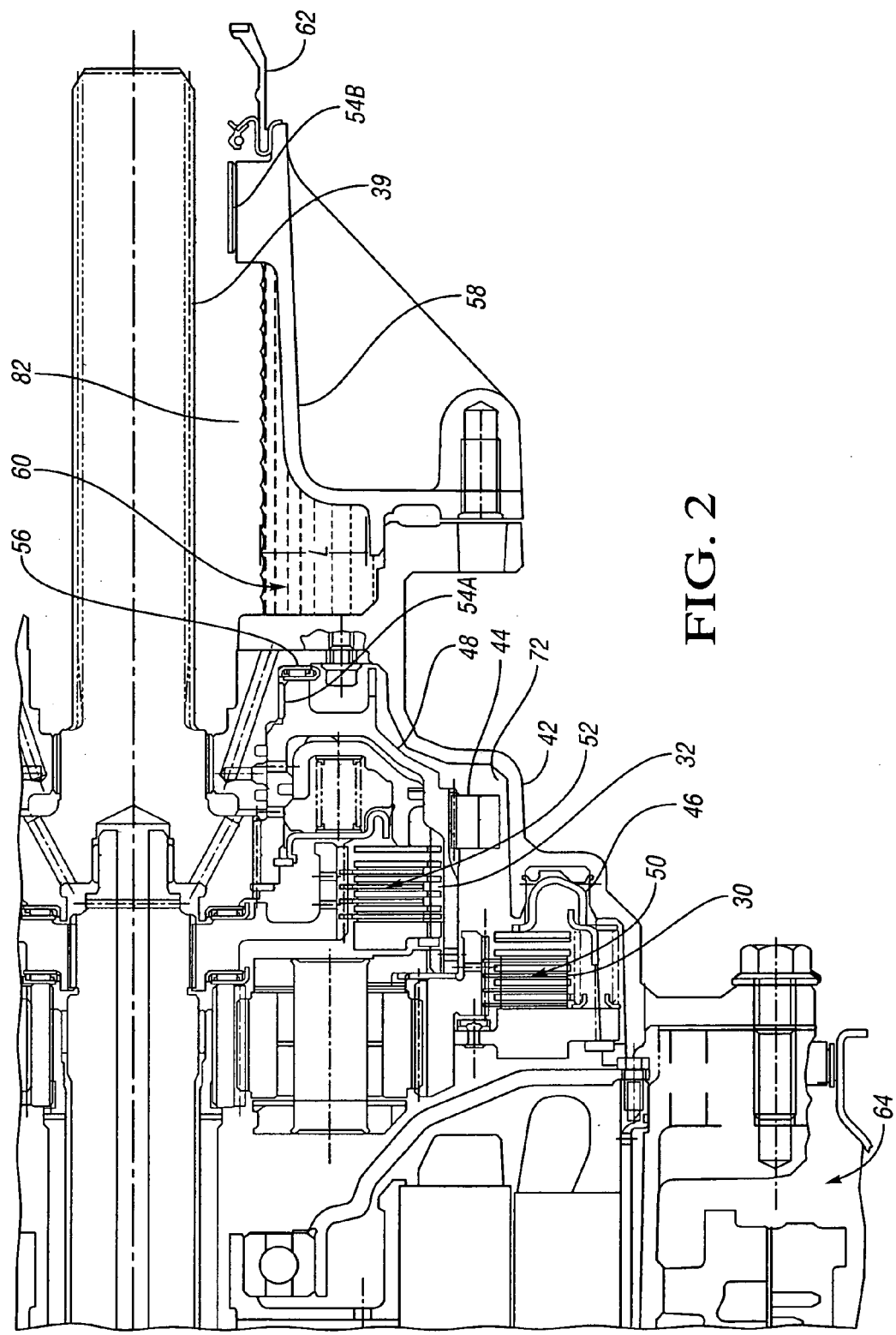
FIG. 2 is a fragmentary cross-sectional view of a portion of the transmission of FIG. 1 illustrating a drive unit extension connected to the rear housing.

A main casing or housing 40 generally surrounds the motor/generator modules 14, 16 as well as clutches 26, 28 and planetary gear sets 34, 36. The arrangement of the two motors modules 14, 16 in the transmission 10 requires terminating the main housing 40 immediately aft of the more rearward motor 16. This is necessary in order to permit installation of the two motor/generator modules 14, 16 from opposing openings in the main housing. Referring also to FIGS. 1 and 2, a rear housing 42 mounts to the transmission main housing 40 at a front end 43 of the rear housing 42 to encase much of the transmission functionality, including a park pawl engagement gear 44 of a park pawl system (other components in the park pawl system such as an actuator not shown), the third and fourth clutches 30, 32, and the third planetary gear set 38. Transmission lubrication fluid is present at the aft end of the transmission in residual from the third clutch piston 46 and the fourth clutch piston 48, from the third clutch pack 50 and the fourth clutch pack 52, and from support bushings 54A, 54B and thrust bearing 56 lubrication fluid. A drive unit extension 58 is bolted to the rearward end 59 (shown in FIG. 1) of the rear housing 42. The drive unit extension 58 is a housing component that houses the output member 39 and is configured to interact with additional drive line structure (not shown) to transmit power to vehicle wheels (not shown) as is well understood by those skilled in the art. Referring to FIG. 2, a well 60 is formed between the rear housing 42 and the drive unit extension 58. A moderate amount of residual cooling fluid is desirable for lubricating support bushing 54B (which is a driveline shaft bushing) and a transmission output seal 62 that are connected to drive unit extension 58 to pilot and seal the drive unit extension 58 to additional drive unit structure (not shown) that is splined to the output member 39 to complete the transmission driveline. A two-wheel drive adaptation is pictured, but the invention applies equally to a four-wheel drive adaptation. However, since excessive fluid at the aft end of the transmission is detrimental to transmission performance (by increasing spin losses and pumping losses), a method of returning the residual lubrication fluid is required. Since the clutches 30, 32 and planetary gear set 38 packaged at the aft end of the transmission 10 do not allow direct return of the residual lubricating fluid (i.e., via an angle drilled passage) to a sump 64, the rear housing 42 must provide a path for this fluid to the sump 64. That is, because the rear housing 42 encases much of the transmission functionality, the residual fluid at the output seal 62 is not in reasonable proximity to the sump 64 to use typical methods (such as angle drilling or sand cast cored passages) of returning spent lubrication fluid to the sump 64.

Figure 3:
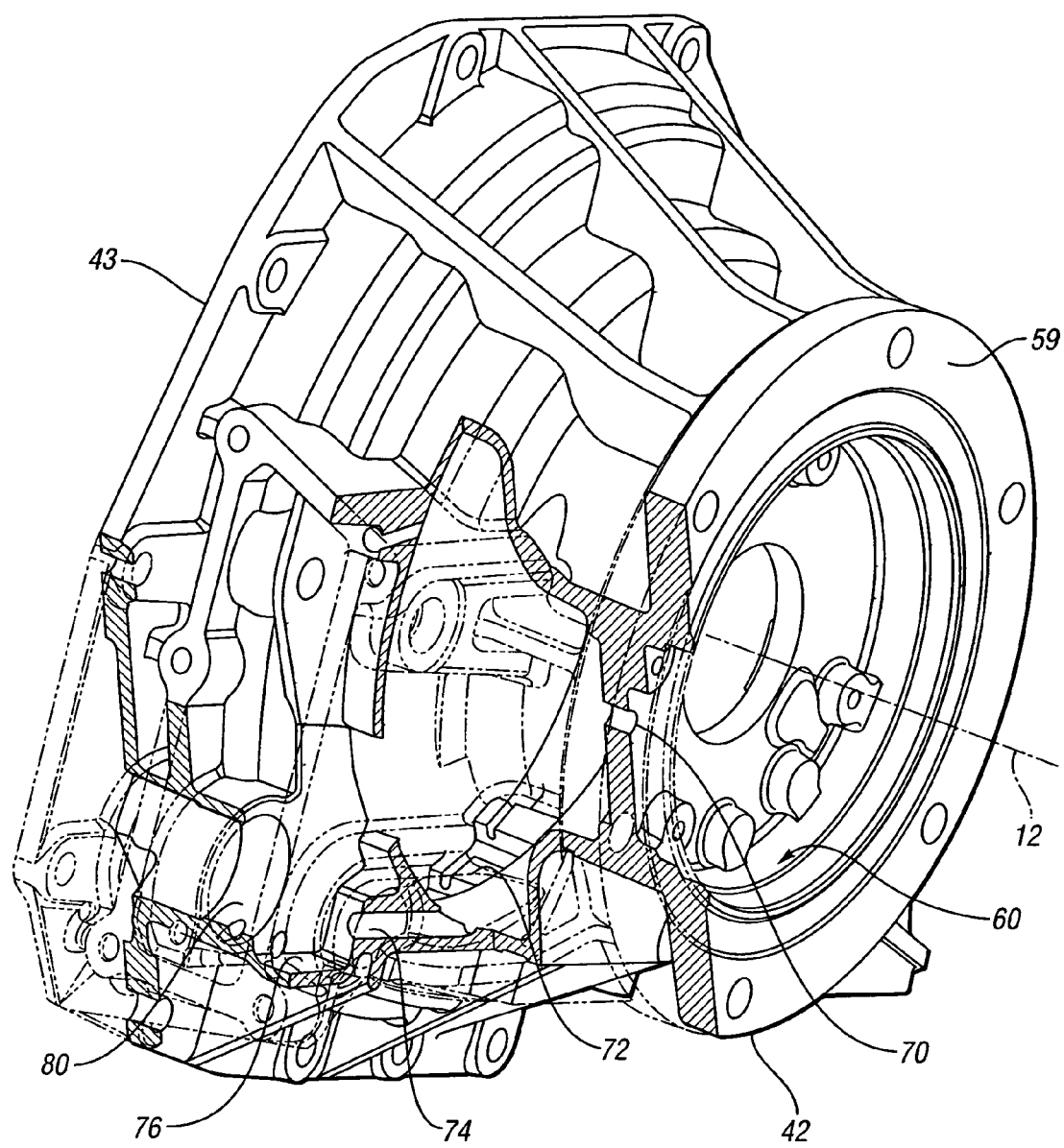
FIG. 3 is a schematic perspective illustration in partial phantom, and partial cross-sectional view of the rear housing of FIGS. 1 and 2.

Referring to FIGS. 2 and 3, the rear housing 42 includes a short axial passage or opening 70 (shown only in FIG. 3) parallel to the transmission center axis 12 to connect the well 60 at the output seal 62 to a cylindrical well 72 housing the park engagement gear 44 of FIG. 2. A normal horizontal cross passage 74 connects the bottom of the park engagement gear well 72 to the park engagement system access well 76 in the rear cover 42. The park engagement system well 76 is sized to contain a park pawl actuator (not shown). The park pawl engagement system well 76 is connected by a preferably cast relief second axial passage 80 to the sump 64 (see FIG. 2), bypassing the third and fourth clutches 36, 38, without requiring long angle drilled holes, or cast cored holes.

Figure 4:
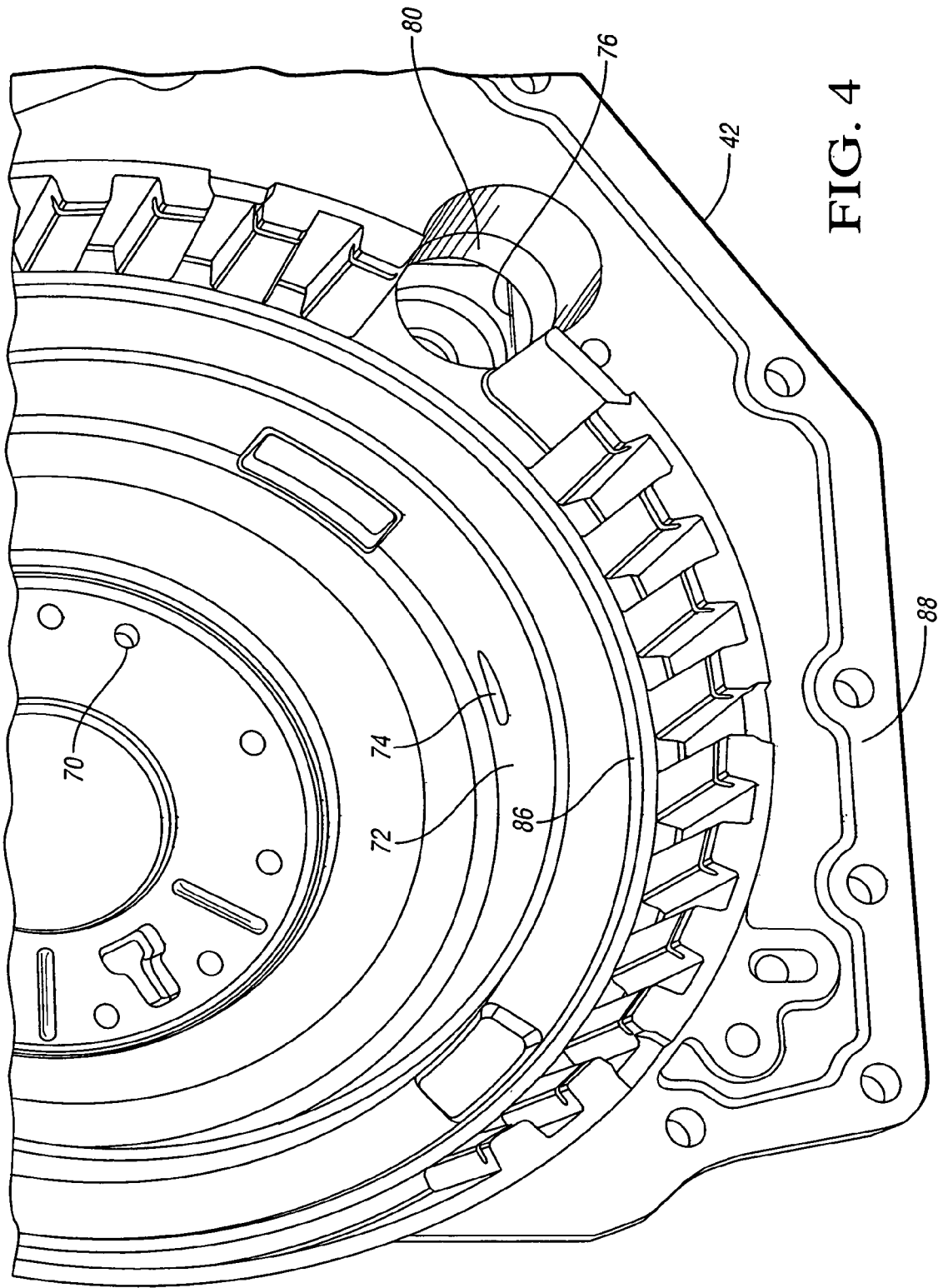
FIG. 4 is a fragmentary perspective view of an inner side of the rear housing of FIGS. 1-3.

FIG. 4 shows a view looking rearward from inside of the rear housing 42. The first axial passage 70, the park engagement gear well 72, the cross passage 74, the park engagement system access well 76 and the second axial passage 80 together create the fluid return path from the well 60 (see FIG. 2) to the main housing 40. Referring to FIG. 2, an additional benefit of this lube return system is that the pooling of lubrication fluid 82 on the transmission output seal 62 may be set to optimal level L by location of the axial passage 70 connecting the output seal well 60 to the park pawl engagement gear well 72. If a typical long angle drilled return path were utilized, the angle drilled passage would likely interrupt the park pawl engagement gear well 72 and the fourth piston bore 86 before exiting through a portion 88 of the rear housing 42. Such a path is not desirable as the fourth piston 48 will block drainage and the seam area at the edge of the rear housing 42 (near portion 88 of FIG. 4) will be compromised.

Assuming the rear housing 42 will be made from a die casting with relatively short, straight drilled or cast passages 70, 74, this invention may reduce the number of rear housings rejected for leaks in comparison to housings having a long compound drilled hole typical for draining output well oil to sump. Associated costs including added leak testing, impregnation salvage rework, reinspection, and additional scrap may also be reduced.

Another alternative to the long compound drilled passages is cored passages, which would require that the rear housing be made by sand casting. The sand casting process could significantly increase the cost of the rear housing. Because the invention utilizes a series of short drilled passages and internal wells, core casting is not necessary and the prohibitive cost associated with core casting is avoided.

With reference to the structure shown and described with respect to FIGS. 1-4, a method of returning fluid in a transmission 10 to a transmission sump 64 includes casting a rear housing 42. The method also provides drilling a generally axial passage 70 in the rear housing 42 and drilling another passage 74 generally perpendicular to the axial passage 70. Next, the rear housing 42 is connected to the main housing 40 and a drive unit extension 58 is connected to the rear housing 42 to form a well 60 therebetween. Finally, output seal 62 and driveline shaft bushing 54B in the drive unit extension 58 are lubricated and fluid used to lubricate the output seal 62 and driveline shaft bushing 54B is drained from the well 60 to an oil sump 64 through the passages 70, 74.

While the best mode for carrying out the invention has been described in detail, those familiar with the art to which this invention relates will recognize various alternative designs and embodiments for practicing the invention within the scope of the appended claims.

The invention claimed is:

1. A transmission case comprising:
   a rear housing adapted to partially enclose transmission components about a center axis and sealingly connectable to a main housing at one end and a drive unit extension at another end;
   wherein said rear housing has an axial passage generally parallel to the center axis and a cross passage substantially perpendicular to said axial passage and in fluid communication therewith for draining fluid from said drive unit extension to said main housing; and wherein said rear housing cooperates with said drive unit extension to at least partially form a well when said drive unit extension is connected thereto, said well being in fluid communication with said axial passage such that fluid drains from said well through said axial passage.

2. The transmission case of claim 1, wherein said axial passage is positioned such that a predetermined level of fluid is maintained in said well for lubricating an output seal on said drive unit extension.

3. The transmission case of claim 1, wherein said rear housing at least partially forms a first internal well and a second internal well fluidly connected with said first internal well via said cross passage; and
   wherein fluid drained to said main housing through said axial passage passes through said first and second internal wells.

4. The transmission case of claim 3, wherein said transmission components include a park engagement gear; and wherein said first internal well houses said park engagement gear.

5. The transmission case of claim 1, wherein said axial passage is a first axial passage; wherein said first axial passage is between said drive unit extension and said cross passage; and wherein said rear housing has a second axial passage in fluid communication between said cross passage and said main housing for draining fluid to said main housing.

6. The transmission case of claim 1, wherein said rear housing is formed by die casting.

7. The transmission case of claim 6, wherein said axial passage and said cross passage are formed by said die casting.

8. The transmission case of claim 6, wherein said axial passage and said cross passage are drilled after said die casting.

9. The transmission case of claim 1, wherein said rear housing is characterized by a generally frustoconical shape.

10. A hybrid electromechanical transmission including:
   an input member;
   an output member;
   first and second electric motor/generators operatively connected between said input member and said output member for selectively providing power to said output member and for selectively storing power;
   a main housing substantially enclosing said first and second motor/generators;
   a rear housing connected to said main housing between said main housing and said output member and further enclosing said first and second motor/generators;
   a drive unit extension connected to said rear housing and circumscribing said output member;
   a seal member connected to said drive unit extension;
   wherein a well is formed between said rear housing and drive unit extension; and
   wherein said rear housing has an axial opening positioned to maintain a predetermined level of fluid in said well for lubricating said seal member and to drain fluid in said well above said predetermined level to said main housing.

11. The hybrid electromechanical transmission of claim 10, wherein said rear housing further has a cross passage substantially perpendicular to said axial passage and in fluid communication therewith for draining fluid within said drive unit extension to said main housing.

12. The hybrid electromechanical transmission of claim 11, wherein said rear housing at least partially forms a first internal well and a second internal well fluidly connected with said first internal well via said cross passage; wherein fluid drained to said main housing through said axial passage passes through said first and second internal wells; wherein said transmission components include a park engagement gear; and wherein said first internal well houses said park engagement gear.

13. The hybrid electromechanical transmission of claim 9, wherein said rear housing is formed by die casting and said axial passage and said cross passage are drilled in said cast rear housing.

14. A method of returning fluid in a transmission to a transmission oil sump, the method comprising:
   casting a rear housing;
   drilling a generally axial passage in said rear housing, wherein said axial passage is generally parallel to a center axis of the transmission;
   drilling another passage generally perpendicular to said axial passage in said rear housing;
   connecting said rear housing to a main housing such that transmission components are contained within said rear housing;
   connecting a drive unit extension to said rear housing to form a well therebetween;
   lubricating an output seal connected to said drive unit extension with fluid in said well;
   draining fluid in said well used to lubricate said output seal to an oil sump through said axial passage and said cross passage; and
   forming a first internal well and a second internal well in said rear housing, said another passage fluidly connecting said first internal well to said second internal well, wherein fluid drained to said oil sump passes through said first and second internal wells.

15. The method of claim 14, wherein said casting includes:
   drilling another axial passage in said rear housing in fluid communication with said second internal well for emptying said fluid from said rear housing to said main housing.

16. The method of claim 14, wherein a driveline bushing is connected to said drive unit extension; wherein said lubricating further lubricates said driveline bushing; and wherein said draining further drains fluid used to lubricate said driveline bushing.

* * * * *